United States Patent
Horimura

[11] Patent Number: 5,256,215
[45] Date of Patent: Oct. 26, 1993

[54] PROCESS FOR PRODUCING HIGH STRENGTH AND HIGH TOUGHNESS ALUMINUM ALLOY, AND ALLOY MATERIAL

[75] Inventor: Hiroyuki Horimura, Saitama, Japan

[73] Assignee: Honda Giken Kogyo Kabushiki Kaisha, Tokyo, Japan

[21] Appl. No.: 775,597

[22] Filed: Oct. 15, 1991

[30] Foreign Application Priority Data

Oct. 16, 1990 [JP] Japan .................................. 2-277058

[51] Int. Cl.$^5$ ............................................. C22F 1/04
[52] U.S. Cl. ..................................... 148/561; 148/698
[58] Field of Search .......................... 148/3, 561, 698; 420/550

[56] References Cited

U.S. PATENT DOCUMENTS

| 4,909,867 | 3/1990 | Masumoto et al. | 148/403 |
| 4,950,452 | 8/1990 | Masumoto et al. | 75/249 |
| 5,053,084 | 10/1991 | Masumoto et al. | 148/561 |

FOREIGN PATENT DOCUMENTS

| 2236325 | 4/1991 | United Kingdom . |
| 2239874 | 7/1991 | United Kingdom . |

*Primary Examiner*—George Wyszomierski
*Attorney, Agent, or Firm*—Lyon & Lyon

[57] ABSTRACT

A process for producing a high strength and high toughness aluminum alloy comprises a first step of preparing an alloy material which has a primary metallographic structure with a volume fraction Vf of a single-phase structure of at least 90%, said single-phase structure is comprised of crystal particles having a particle size of less than 30 nm and an fcc structure (face-centered cubic structure), the alloy having a composition represented by a chemical formula:

$$Al_a T_b X_c$$

wherein T is at least one element selected from a first group including Y, La, Ce, Mm (misch metal) and Ca; X is at least one element selected from a second group including Fe, Co and Ni (but at least one element of Co and Ni, if only Y is selected from the first group); and each of a, b and c represents an atom %, with the proviso that $85 \leq a \leq 97$, $1 \leq b \leq 10$, and $2 \leq c \leq 15$, and a second step of subjecting the alloy material to a thermal treatment at a temperature in a range $\pm 100°$ C. of the temperature of destruction of the single-phase structure to destroy the single-phase structure, thereby providing a second metallographic structure having a combined structure in which an intermetallic compound is uniformly dispersed in a matrix comprised of crystal particles having a particle size of at most 400 nm. This makes it possible to produce an aluminum alloy enhanced not only in strength and toughness at ambient temperature, but also at increased temperatures.

4 Claims, 11 Drawing Sheets

⊢⊣ 50nm

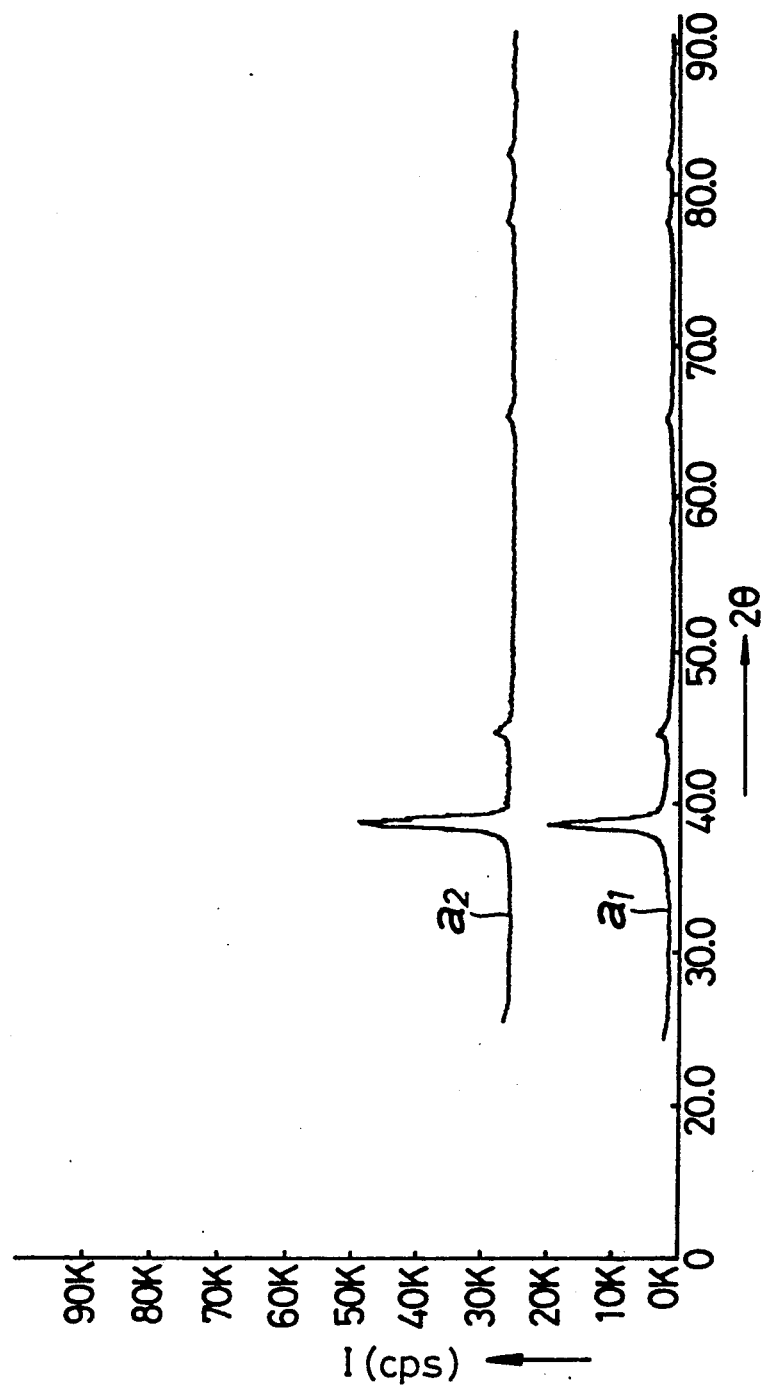

PROCESS FOR PRODUCING HIGH STRENGTH AND HIGH TOUGHNESS ALUMINUM ALLOY, AND ALLOY MATERIAL

BACKGROUND OF INVENTION

1. Field of Invention

The field of the present invention is processes of a type for producing a high strength and high toughness aluminum alloy, and alloy materials.

2. Description of Prior Art

There is such a conventionally known alloy producing process which is a quenching and solidifying process described in Japanese Patent Application Laid-open No. 248860/85.

According to the above prior art process, an aluminum alloy having a micro eutectic structure is produced. However, such an alloy suffers from a problem that the strength and toughness thereof are low, because a partial change in structure and a coalescence of the structure may be produced due to thermal exposure in a service environment, hot plastic working and the like.

SUMMARY OF THE INVENTION

Accordingly, it is an object of the present invention to provide an aluminum alloy producing process of the type described above wherein an aluminum alloy enhanced not only in strength and toughness at ambient temperature, but also at increased temperatures can be produced.

To achieve the above object, according to a first aspect of the present invention, there is provided a process for producing a high strength and high toughness aluminum alloy, comprising a first step of preparing an alloy material which has a primary metallographic structure with a volume fraction Vf of a single-phase structure of at least 90%, said single-phase structure is comprised of crystal particles having a particle size of less than 30 nm and an fcc structure (face-centered cubic structure), and said aluminum alloy has a composition represented by the chemical formula:

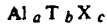

wherein T is at least one element selected from a first group including Y, La, Ce, Mm (misch metal) and Ca; X is at least one element selected from a second group including Fe, Co and Ni (but at least one element of Co and Ni, if only Y is selected from the first group); and each of a, b and c represents an atom %, with the proviso that $85 \leq a \leq 97$, $1 \leq b \leq 10$, and $2 \leq c \leq 15$, and a second step of subjecting the alloy material to a thermal treatment at a temperature in a range of $\pm 100°$ C. of the temperature of destruction of the single-phase structure to destroy the single-phase structure, thereby providing a second metallographic structure having a combined structure in which an intermetallic compound is uniformly dispersed in a matrix comprised of crystal particles having a particle size of at most 400 nm.

In addition, according to a second aspect of the present invention, there is provided a process for producing a high strength toughness aluminum alloy, comprising a first step of preparing an alloy material which has a primary metallographic structure with a volume fraction Vf of a single-phase structure of at least 90%, said single-phase structure is comprised of crystal particles having a particle size of less than 30 nm and an fcc structure, and said aluminum alloy has a composition represented by a chemical formula:

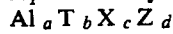

wherein T is at least one element selected from a first group including Y, La, Ce, Mm (misch metal) and Ca; X is at least one element selected from a second group including Fe, Co and Ni; Z is at least one element selected from a third group including Ti, V, Cr, Mn, Zr, Nb, Mo, Si and B; and each of a, b, c and d represents an atom %, with the proviso that $85 \leq a \leq 97$, $1 \leq b \leq 10$, $2 \leq c \leq 15$, and $d \leq 3$, and a second step subjecting the alloy material to a thermal treatment at a temperature in a range of $\pm 100°$ C. of the temperature of destruction of the single-phase structure to destroy the single-phase structure, thereby providing a second metallographic structure having a combined structure in which an intermetallic compound is uniformly dispersed in a matrix comprised of crystal particles having a particle size of at most 400 nm.

In addition to the single-phase structure described above, the primary metallographic structure includes those having a mixed phase structure which is comprised of crystal particles and an amorphous phase, the amorphous phase volume fraction Vf being 80% or less.

The term "temperature of destruction of the single-phase and mixed-phase structures" refers to the temperature in a differential thermal analysis thermocurve at which a rapid exotherm of any alloy material starts. In such a temperature region, the single-phase and mixed-phase structures are destroyed, causing the alloy to precipitate an intermetallic compound and pass into a stable phase structure.

According to the above-described first and second features, the thermal treatment provides a thermally stabilized combined structure, and subsequent changes in the structure and the like cannot be produced by the aid of thermal exposure in a service environment, hot plastic working and the like. This makes it possible to produce an aluminum alloy which is easy to form into a near-net shape and which is enhanced in strength and toughness at both ambient temperature and increased temperatures.

However, if the proportion of each chemical constituent incorporated departs from the above-described range, the resulting aluminum alloy is either high in hardness but brittle (or reduced in strength), or high in toughness but low in hardness.

If the proportion of the single-phase and mixed-phase structure portions in the primary metallographic structure is less than 90%, a coarse intermetallic compound is emerged in a structure other than the single-phase and mixed-phase structures and after thermal treatment remains in the secondary metallographic structure, bringing about an embrittlement of the resulting alloy.

Furthermore, if the particle size of the crystal particles in the single-phase and mixed-phase structures is greater than or equal to 30 nm, the particle size of the crystal particles in the combined structure in the secondary metallographic structure exceeds 400 nm, resulting in an alloy with reduced strength.

Yet further, if the proportion of the amorphous phase in the mixed-phase structure exceeds 80%, it is impossible to provide a uniform secondary metallographic structure.

Yet further, if the thermal treatment is more than 100° C. below the temperature of destruction of the single-phase and mixed-phase structures, it takes a long time for destruction of these structures, resulting in an inferior productivity. On the other hand, if the thermal treatment temperature exceeds the destruction temperature by +100° C., the crystal particles in the combined structure and the intermetallic compound become large in size, and thus bring about an embrittlement of the alloy.

The above and other objects, features and advantages of the invention will become apparent from a reading of the following description of the preferred embodiments, taken in conjunction with the accompanying drawings.

BRIEF DESCRIPTION OF THE DRAWINGS

FIG. 3 is a diagram showing X-ray diffraction patterns for an alloy material;

DESCRIPTION OF THE PREFERRED EMBODIMENTS

An alloy of $Al_{92}Y_3Fe_4Mn_1$ (each numerical value represents an atom %, and hereinafter such alloy will be referred to as a quaternary alloy) will now be described as one example of an aluminum alloy represented by the chemical formula $Al_a T_b X_c Z_d$.

In producing such a quaternary alloy, the following steps are carried out:

(i) First Step

An Al—Y—Fe—Mn based alloy is prepared by an arc melting process and then subjected to a single roll process using a rotatable copper roll having a diameter of 250 mm in an atmosphere of Ar to provide a ribbon-shaped alloy material having a primary metallographic structure. In place of such a quenching and solidifying process, a solid phase reaction process can be also utilized.

(ii) Second Step

The alloy material having a primary metallographic structure is subjected to a thermal treatment to provide a ribbon-shaped quaternary alloy having a secondary metallographic structure.

If the number of rotations of the rotatable roll is changed during the first step, the cooling rate of the alloy material is changed, resulting in a different state of the primary metallographic structure. More specifically, if the number of rotations of the rotatable roll is set, for example, at 1,500 rpm, and the cooling rate is as slow as $2 \times 10^3$ ° C./sec., the volume fraction Vf of a single-phase structure comprised of crystal particles having a particle size of 30 nm and an fcc structure is of at least 90% in the primary metallographic structure. If the number of rotations of the rotatable roll is set at a level exceeding 1,500 rpm and the cooling rate is set at a value faster than the above-described value of $2 \times 10^3$° C./sec., a mixed-phase structure comprised of an amorphous phase and crystal particles having a particle size of less than 30 nm and an fcc structure is provided in the primary metallographic structure. In this case, the cooling rate is controlled, such that the volume fraction of the mixed-phase structure is at least 90%, and the volume fraction Vf of the amorphous phase in the mixed-phase structure is at most 80%.

Figure 1:
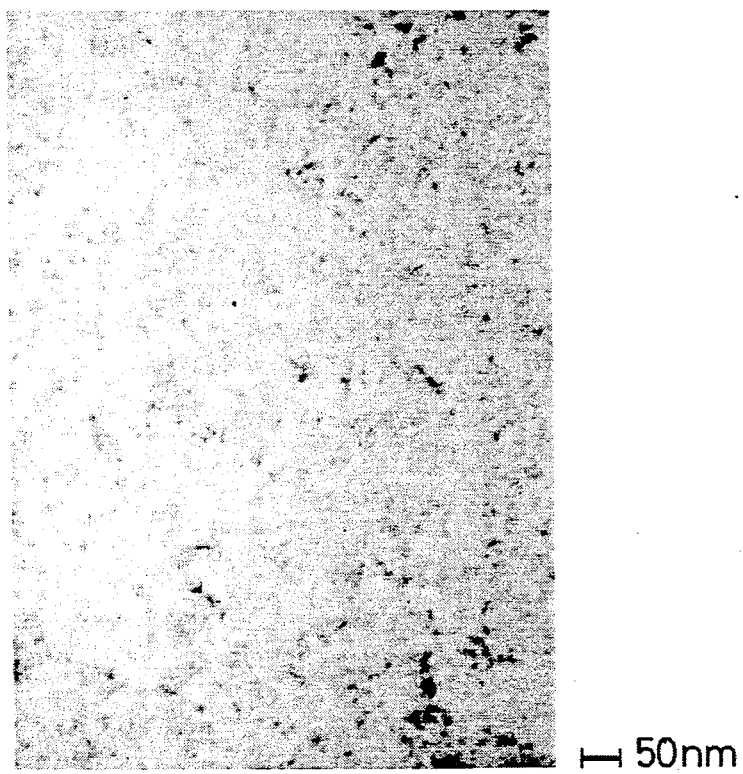
FIG. 1 is a photomicrograph showing a metallographic structure of an alloy material.

FIG. 1 is a transmission type electron photomicrograph ($100,000 \times$ magnification) illustrating a metallographic structure of the quaternary alloy material. The volume fraction Vf of the single-phase structure in the primary metallographic structure of this alloy material is of 100% and therefore, the primary metallographic structure is comprised of only an aggregate of fine crystal particles having a particle size of less than 30 nm. This was clarified by observing the alloy material in an observation using an electronic microscope at an incline. Furthermore, it was confirmed that the single-phase structure was not a structure in which fine crystal particles were dispersed in a matrix.

Figure 2:
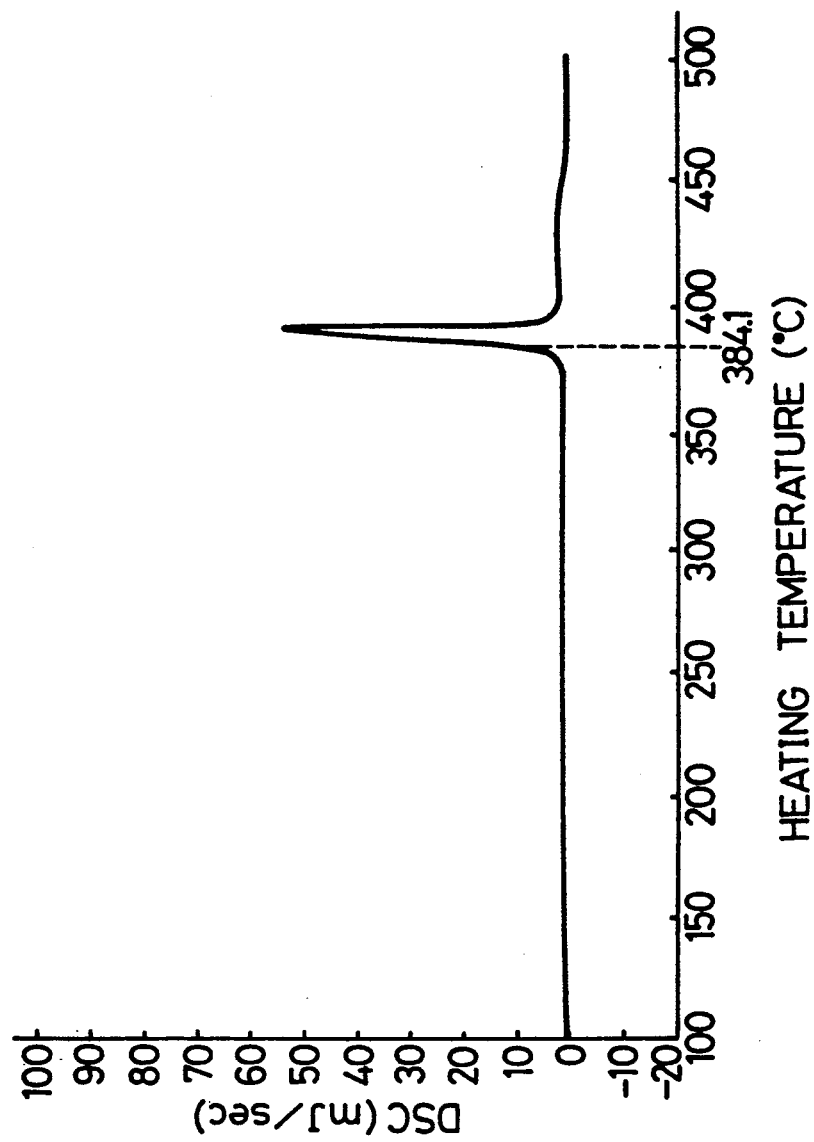
FIG. 2 is a diagram showing a differential thermal analysis thermocurve for the alloy material.

FIG. 2 is a diagram illustrating a differential thermal analysis thermocurve for the alloy material (wherein the temperature-rising rate is of 20° C./min). In this alloy material, a rapid exotherm was started at a heating temperature of 384.1° C., and hence, it can be seen that the temperature of destruction of the single-phase structure is of 384.1° C.

FIG. 3 is a diagram illustrating X-ray diffraction patterns of an alloy material, wherein line $a_1$ indicates that of the alloy material after being produced by a single-roll process, and $a_2$ indicates that of the alloy material after being subjected to a thermal treatment at 350° C. for one hour. It can be seen from FIG. 3 that no destruction of the single-phase structure occurs, even if the alloy material is subjected to a thermal treatment at 350° C. or less for one hour. However, if the thermal treatment is conducted for a longer time even at a heating temperature of 350° C., a change in the phase structure occurs.

The temperature at the second step may be set in temperature range of 384.1° C.±100° C. on the basis of the above-described destruction temperature determined from FIGS. 2 and 3. For this embodiment, the thermal treatment temperature was set at 400° C. for one hour.

Figure 4A:
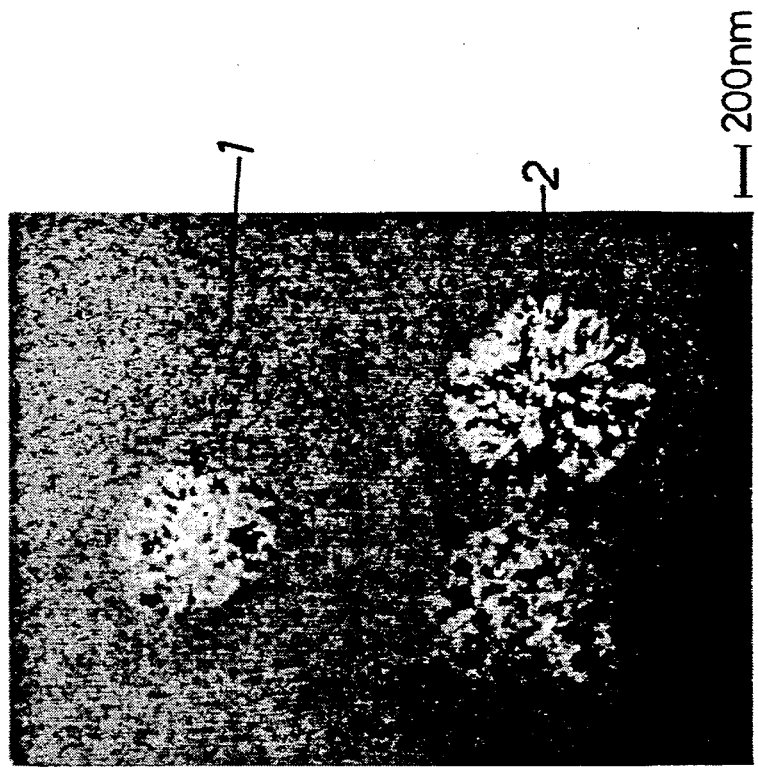
FIG. 4A is a photomicrograph showing a metallographic structure of an alloy material after a lapse of 10 minutes of thermal treatment.
Figure 4B:
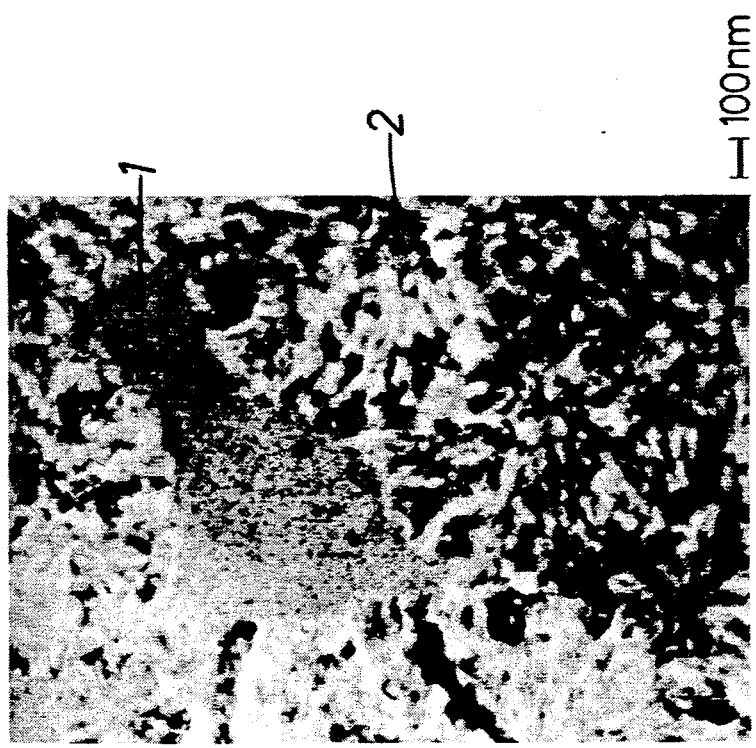
FIG. 4B is a photomicrograph showing a metallographic structure of the alloy material after a lapse of 20 minutes of thermal treatment.

Each of FIGS. 4A and 4B is a transmission type electron photomicrograph illustrating the metallographic structure of the alloy material after partial thermal treatment. FIG. 4A is of 30,000×magnification, and FIG. 4B is of 50,000×magnification.

FIG. 4A shows the metallographic structure of the alloy material after a lapse of 10 minutes, wherein it can be seen that a portion of the single-phase structure 1 was destroyed, so that a spherical combined structure 2 is emerged in the single-phase structure 1. This combined structure 2 is comprised of an intermetallic compound uniformly dispersed in a matrix which is an aggregate of crystal particles.

FIG. 4B shows the metallographic structure of the alloy material after a lapse of 20 minutes in the thermal treatment, wherein it can be seen that most of the single-phase structure 1 was destroyed and the proportion of occupation by the combined structure 2 increased.

Figure 5:
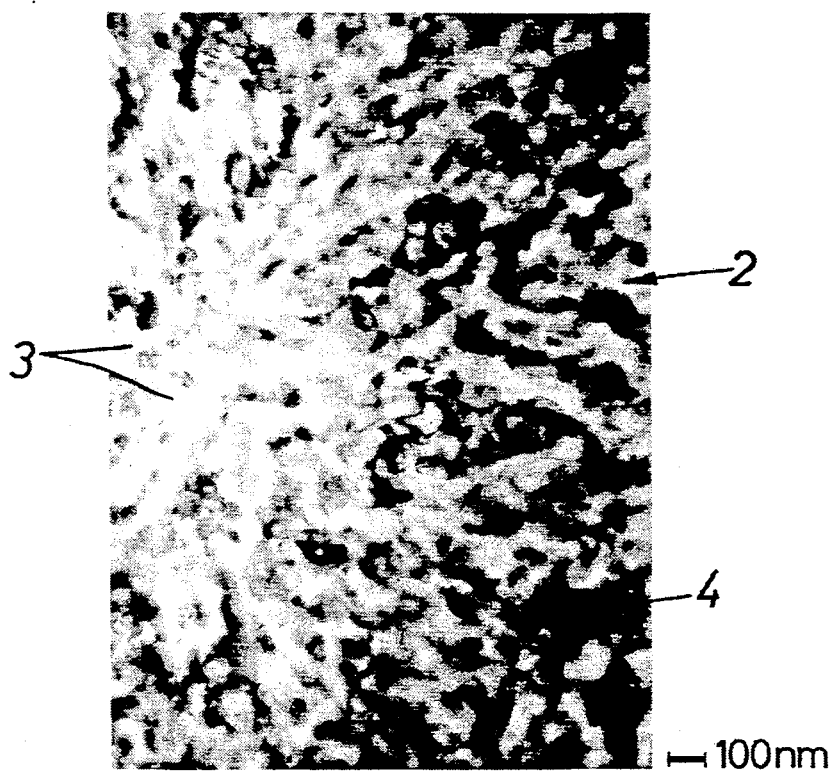
FIG. 5 is a photomicrograph showing a metallographic structure of an aluminum alloy.

FIG. 5 is a transmission type electron photomicrograph (50,000×magnification) illustrating the metallographic structure of a quaternary alloy. In the combined structure thereof, reference numeral 3 indicates crystal particles of 400 nm or less forming a matrix, and reference numeral 4 indicates an intermetallic compound which is of the $Al_3Y$, Al-Fe, Al-Mn or Al-Fe-Y type.

Figure 6:
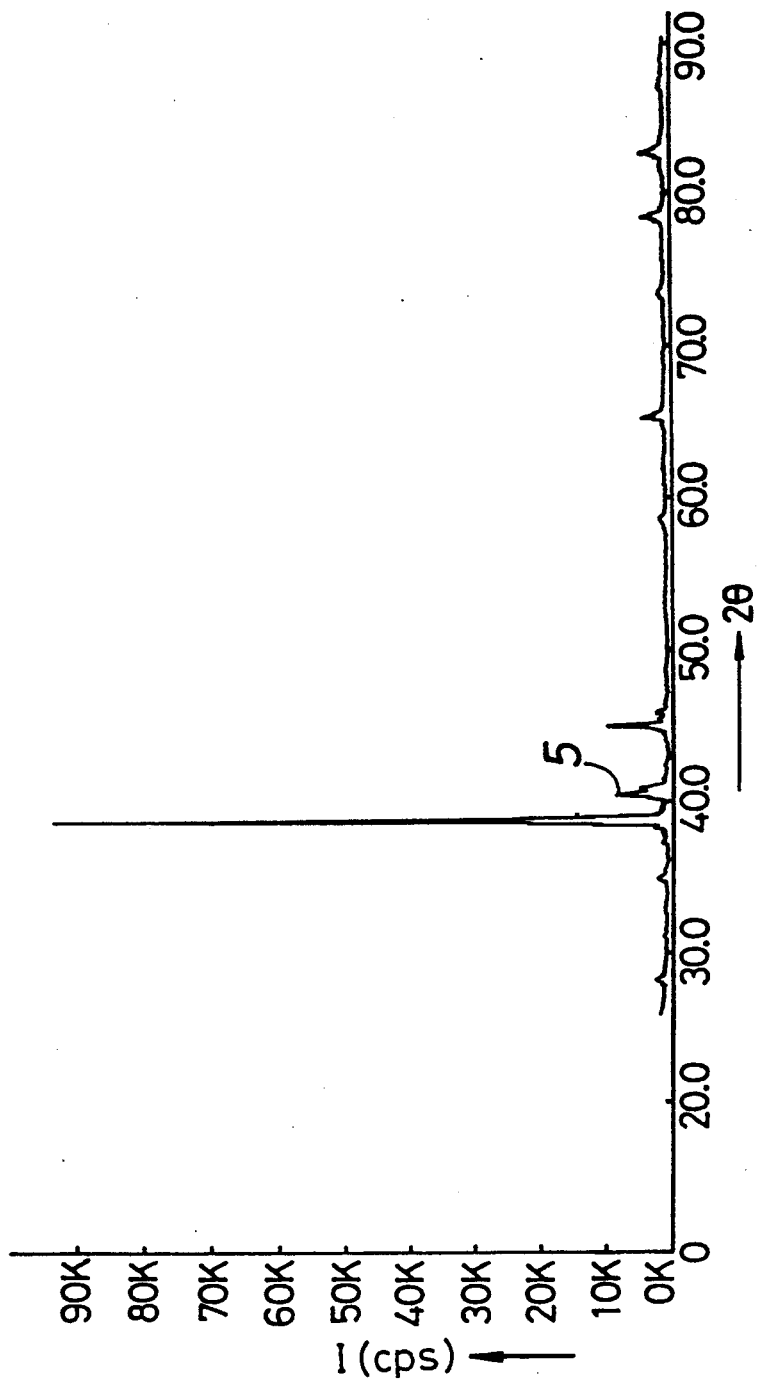
FIG. 6 is a diagram showing an X-ray diffraction pattern for the aluminum alloy.

FIG. 6 is a diagram illustrating an X-ray diffraction pattern for the quaternary alloy. As apparent from comparison with FIG. 3, it can be seen that there is a peak 5 appearing in FIG. 6 due to an intermetallic compound produced by a thermal treatment at 400° C. for 1 hour.

Figure 7:
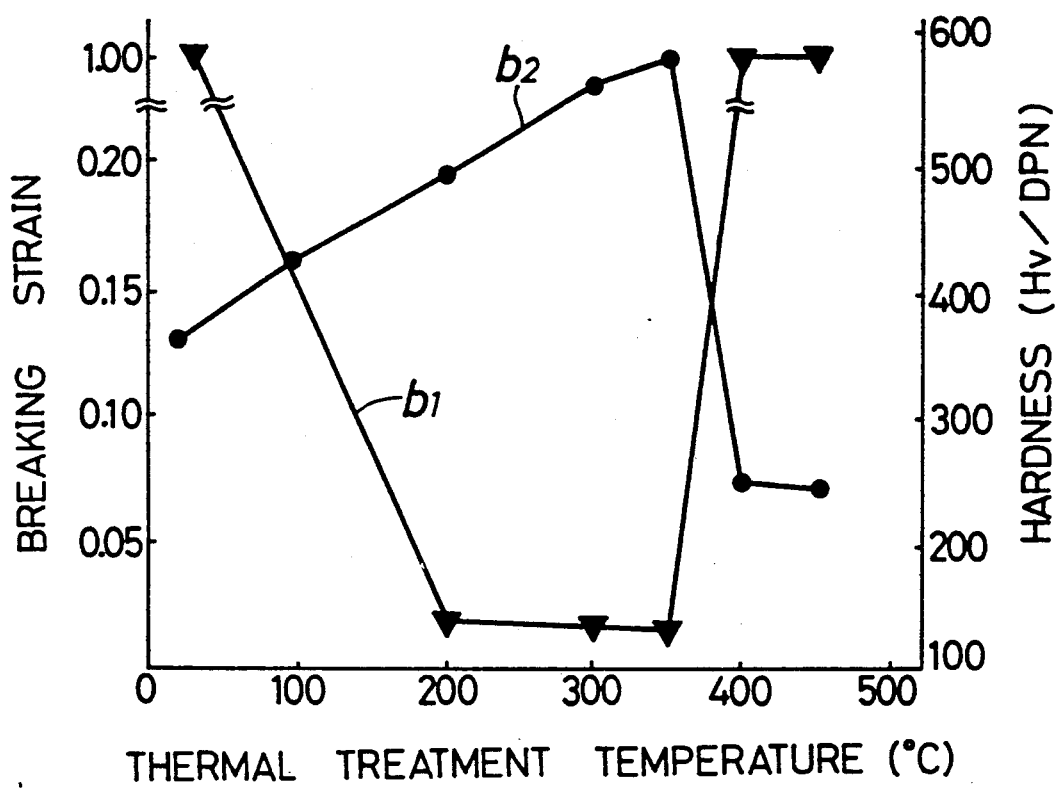
FIG. 7 is a graph illustrating a relationship between the thermal treatment temperature and the breaking strain as well as the hardness.

FIG. 7 is a graph illustrating a relationship between the thermal treatment temperature and the breaking strain as well as the hardness for a quaternary alloy, wherein the line $b_1$ indicates the breaking strain, and a line $b_2$ indicates the hardness. The thermal treatment time is of 1 hour.

It can be seen from FIG. 7 that if the thermal treatment temperature is set at a level equal to or more than 400° C., the single-phase structure is destroyed, resulting in a breaking strain showing approximately 1.00, ensuring that a close-contact flexure through 180° is possible. It can also be seen that the hardness is of 200 to 350 DPN and thus, it is possible to provide a quaternary alloy having a high strength and a high toughness by a thermal treatment at 400° C. for 1 hour.

Figure 8:
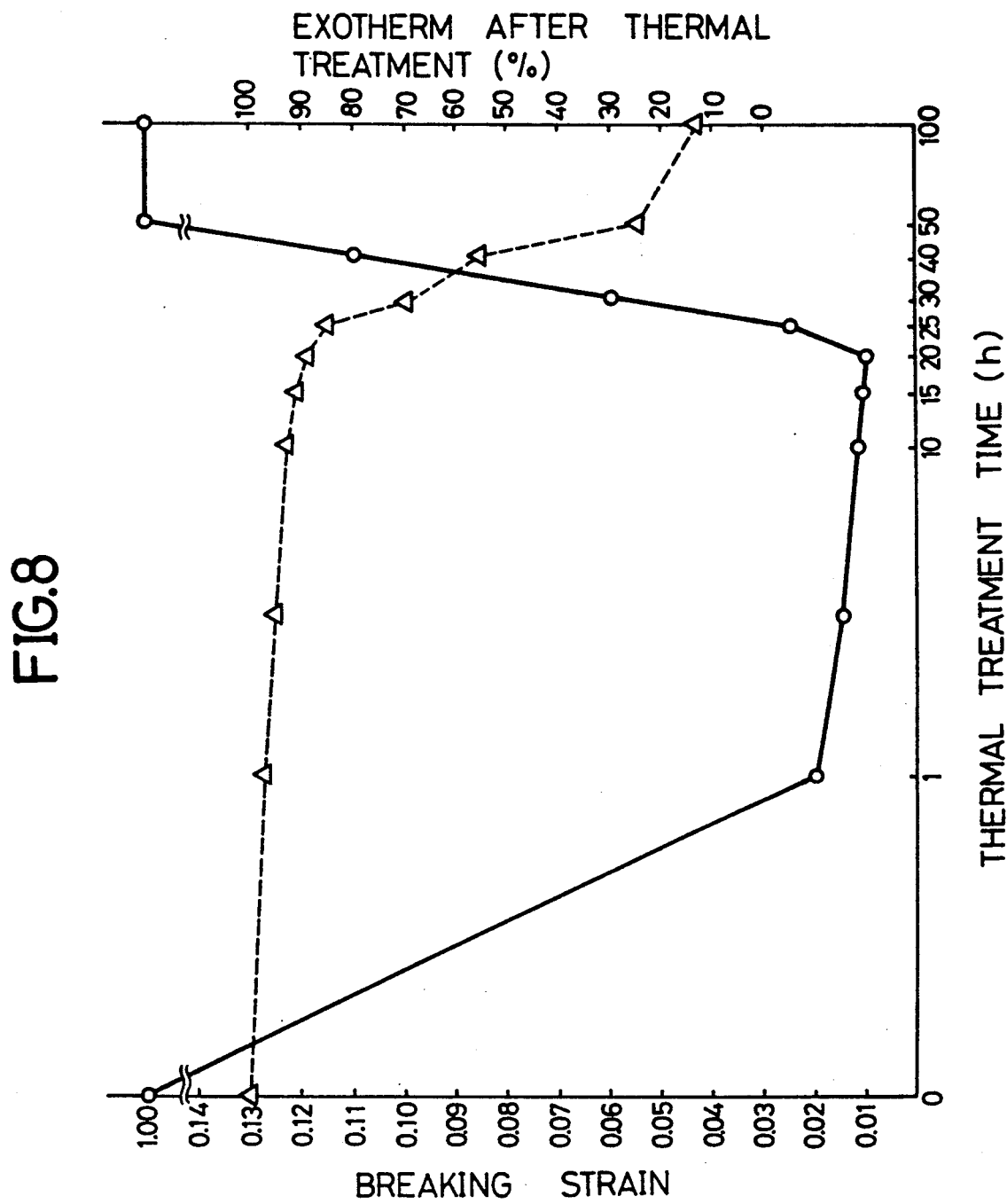
FIG. 8 is a graph illustrating a relationship between the thermal treatment time and the breaking strain as well as the exotherm after the thermal treatment.

FIG. 8 is a graph illustrating a relationship between the thermal treatment time and the breaking strain as well as an exotherm after a thermal treatment for the quaternary alloy, wherein a dashed line indicates the exotherm and a solid line indicates the breaking strain. The thermal treatment temperature is set at 300° C., and the exotherm is represented by a percentage based on the exotherm which can be generated by an alloy material before a thermal treatment and hence after being produced.

It can be seen FIG. 8 that in order to sufficiently destroy the single-phase structure to insure a high breaking strain of at least 0.09, it is required to consume an exotherm of more than 40% in the thermal treatment and to control the unconsumed exotherm remaining in the quaternary alloy after the thermal treatment to a level of 60% or less.

Table I lists the metallographic structure of each of various ribbon-shaped alloy materials. Table I also lists the state and physical properties of the combined structure in each of the various ribbon-shaped quaternary alloys produced by subjecting the ribbon-shaped alloy materials to a thermal treatment at 400° C. for 1 hour.

The term "fcc" in Table 1 means a crystal particle having an fcc structure and particle size of 30 nm or less.

The breaking strain was measured by a bending test. This method for measuring the breaking strain is the same that was used for examples which will be described hereinafter. In addition, the tensile strength $\sigma_B$ was determined by measuring a breaking load by use of an Instron type tensile tester at room temperature and then finding the sectional area by examination in a scanning electron microscope.

TABLE I

| Example No. | Alloy material | | | | Quaternary alloy | | |
|---|---|---|---|---|---|---|---|
| | Vf of SPT (%) | Vf of MPT (%) | Vf of Each P. % fcc | A.P. | State of CT | T.S. (kg f/mm²) | B.S. |
| 1 | 100 | — | — | — | uniform | 80.2 | 1.0 |
| 2 | 90 | — | — | — | uniform | 82.6 | 1.0 |
| 3 | 80 | — | — | — | nonuniform | 55.0 | 0.1 |
| 4 | 70 | — | — | — | nonuniform | 48.4 | 0.06 |
| 5 | — | 100 | 60 | 40 | uniform | 78.8 | 1.0 |
| 6 | — | 100 | 40 | 60 | uniform | 81.3 | 1.0 |
| 7 | — | 100 | 30 | 70 | uniform | 81.0 | 1.0 |
| 8 | — | 100 | 20 | 80 | uniform | 81.8 | 1.0 |
| 9 | — | 100 | 10 | 90 | nonuniform | 51.1 | 0.08 |
| 10 | — | 90 | 85 | 15 | uniform | 81.4 | 1.0 |
| 11 | — | 80 | 90 | 10 | nonuniform | 52.9 | 0.08 |
| 12 | — | 70 | 90 | 10 | nonuniform | 49.8 | 0.08 |

Vf = Volume fraction
CT = combined structure
SPT = single-phase structure (fcc) in primary metallographic structure
MPT = mixed-phase structure in primary metallographic structure
each P. = each phase in mixed-phase structure
A.P. = amorphous phase
T.S. = tensile strength
B.S. = breaking strain In Table I, example Nos. 1, 2, 5 to 8 and 10 correspond to quaternary alloys produced in accordance with the present invention, wherein it can be seen that a quarternary alloy having a high strength and a high toughness can be produced. The hardness of each of these alloys is about 247 DPN.

For comparison the cooling rate was reduced in preparing ribbon-shaped alloy materials having the same composition as the above-described examples, thereby providing two alloy materials having a combined structure as described above. These alloy materials were subsequently subjected to a thermal treatment at 400° C. for 1 hour to provide quaternary alloys.

Table II shows the volume fraction and physical properties of each combined structure in the secondary metallographic structure of each quaternary alloys.

TABLE II

| | Quaternary Alloy | | |
|---|---|---|---|
| Example No. | Vf of combined structure (%) | Tensile strength (kgf/mm²) | breaking strain |
| 13 | 100 | 61.3 | 0.09 |

TABLE II-continued

| Example No. | Quaternary Alloy Vf of combined structure (%) | Tensile strength (kgf/mm²) | breaking strain |
|---|---|---|---|
| 14 | 95 | 59.6 | 0.09 |

Vf = volume fraction

In the quaternary alloys of example Nos. 13 and 14, a partial variation in structure and a coalescence of the structure occurred in a temperature range of 350° C. or less due to the combined structure initially possessed by these quaternary alloys; therefore, these quaternary alloys are inferior in uniformity of the combined structure and heat resistance and also lower in toughness, as compared with the quaternary alloys produced according to the present invention. According to the present invention, the single-phase or mixed-phase structure can be destroyed to provide a combined structure, and hence, a coalescence of the structure or the like cannot be brought about.

Table III lists various compositions of ribbon-shaped alloys of $Al_a T_b X_c$ that were used in example Nos. 15 to 30 of the present invention. In this case, one element selected from a first group including Y, La, Ce, Mm (Misch metal) and Ca is used as T, and one element selected from a second group including Fe, Co and Ni is used as X.

TABLE III

| Example No. | Chemical constituent (atom %) | | | | | | | |
|---|---|---|---|---|---|---|---|---|
| | Al | Y | La | Ce | Mm | Ca | Fe | Co | Ni |
| 15 | 92 | 3 | — | — | — | — | — | 5 | — |
| 16 | 92 | 2 | — | — | — | — | — | 6 | — |
| 17 | 92 | 3 | — | — | — | — | — | — | 5 |
| 18 | 92 | 2 | — | — | — | — | — | — | 6 |
| 19 | 92 | — | 3 | — | — | — | 5 | — | — |
| 20 | 92 | — | — | 3 | — | — | 5 | — | — |
| 21 | 92 | — | — | — | 3 | — | 5 | — | — |
| 22 | 92 | — | — | — | — | 5 | 5 | — | — |
| 23 | 92 | — | 3 | — | — | — | — | 5 | — |
| 24 | 92 | — | — | 3 | — | — | — | 5 | — |
| 25 | 92 | — | — | — | 3 | — | — | 5 | — |
| 26 | 90 | — | — | — | — | 5 | — | 5 | — |
| 27 | 92 | — | 3 | — | — | — | — | — | 5 |
| 28 | 92 | — | — | 3 | — | — | — | — | 5 |
| 29 | 92 | — | — | — | 3 | — | — | — | 5 |
| 30 | 90 | — | — | — | — | 5 | — | — | 5 |

Table IV lists the metallographic structure of each of ribbon-shaped alloy materials in example Nos. 15 to 30 of the present invention. Furthermore, Table IV lists the physical properties of each of the ribbon-shaped alloys $Al_a T_b X_c$ produced by a thermal treatment of the alloy materials at 400° C. for 1 hour and having a combined structure as described above.

TABLE IV

| Example No. | Alloy material Vf of MPT (%) | Vf of each P. (%) fcc | A.P. | Alloy of $Al_aT_bX_c$ Hardness (DPN) | Breaking strain |
|---|---|---|---|---|---|
| 15 | 100 | 35 | 65 | 205 | 1.0 |
| 16 | 100 | 45 | 55 | 200 | 1.0 |
| 17 | 100 | 25 | 75 | 201 | 1.0 |
| 18 | 100 | 30 | 70 | 201 | 1.0 |
| 19 | 100 | 40 | 60 | 210 | 1.0 |
| 20 | 100 | 40 | 60 | 216 | 1.0 |
| 21 | 100 | 40 | 60 | 222 | 1.0 |
| 22 | 100 | 50 | 50 | 170 | 1.0 |
| 23 | 100 | 35 | 65 | 202 | 1.0 |
| 24 | 100 | 35 | 65 | 205 | 1.0 |
| 25 | 100 | 35 | 65 | 201 | 1.0 |
| 26 | 100 | 45 | 55 | 168 | 1.0 |
| 27 | 100 | 25 | 75 | 199 | 1.0 |
| 28 | 100 | 25 | 75 | 202 | 1.0 |
| 29 | 100 | 25 | 75 | 210 | 1.0 |
| 30 | 100 | 35 | 65 | 173 | 1.0 |

Vf = volume fraction
MPT = mixed phase structure in primary metallographic structure
each P. = each phase in mixed phase structure
A.P. = amorphous phase Table V lists various compositions of ribbon-shaped alloys of $Al_a T_b X_c$ in example Nos. 31 to 40 of the present invention. In this case, one element selected from a first group including Y, La, Ce, Mm (Misch metal) and Ca is used as T, and two elements selected from a second group including Fe, Co and Ni are used as X.

TABLE V

| Example No. | Chemical constituent (atom %) | | | | | | | | |
|---|---|---|---|---|---|---|---|---|---|
| | Al | Y | La | Ce | Mm | Ca | Fe | Co | Ni |
| 31 | 92 | 3 | — | — | — | — | 4 | 1 | — |
| 32 | 92 | 3 | — | — | — | — | 4 | — | 1 |
| 33 | 92 | 3 | — | — | — | — | 1 | 4 | — |
| 34 | 92 | 3 | — | — | — | — | — | 4 | 1 |
| 35 | 92 | 3 | — | — | — | — | 1 | — | 4 |
| 36 | 92 | 3 | — | — | — | — | — | 1 | 4 |
| 37 | 92 | — | — | — | 3 | — | 4 | — | 1 |
| 38 | 92 | — | — | 3 | — | — | 1 | — | 4 |
| 39 | 92 | — | 3 | — | — | — | — | 4 | 1 |
| 40 | 90 | — | — | — | — | 5 | 1 | — | 4 |

Table VI lists the metallographic structure of each ribbon-shaped alloy materials in example Nos. 31 to 40 of the present invention. Furthermore, Table VI lists the physical properties of each of the ribbon-shaped alloys of $Al_a T_b X_c$ produced by subjecting the alloy materials to a thermal treatment at 400° C. for 1 hour and having a combined structure as described above.

TABLE VI

| Example No. | Alloy material Vf of MPT (%) | Vf of each P. (%) fcc | A.P. | Alloy of $Al_aT_bX_c$ Hardness (DPN) | Breaking strain |
|---|---|---|---|---|---|
| 31 | 100 | 40 | 60 | 218 | 1.0 |
| 32 | 100 | 40 | 60 | 220 | 1.0 |
| 33 | 100 | 35 | 65 | 210 | 1.0 |
| 34 | 100 | 35 | 65 | 210 | 1.0 |
| 35 | 100 | 28 | 72 | 209 | 1.0 |
| 36 | 100 | 28 | 72 | 206 | 1.0 |
| 37 | 100 | 40 | 60 | 231 | 1.0 |
| 38 | 100 | 28 | 72 | 209 | 1.0 |
| 39 | 100 | 35 | 65 | 216 | 1.0 |
| 40 | 100 | 40 | 60 | 180 | 1.0 |

Vf = volume fraction
MPT = mixed phase structure in primary metallographic structure
each P. = each phase in mixed phase structure
A.P. = amorphous phase Table VII lists various compositions of ribbon-shaped alloys of $Al_a T_b X_c$ in example Nos. 41 to 45 of the present invention. In this case, two elements selected from a first group including Y, La, Ce, Mm (Misch metal) and Ca are used as T, and two elements selected from a second group including Fe, Co and Ni are used as X.

TABLE VII

| Example No. | Chemical constituent (atom %) | | | | | | | |
|---|---|---|---|---|---|---|---|---|
| | Al | T | | | | X | | |
| | | Y | La | Ce | Mm | Ca | Fe | Co | Ni |
| 41 | 92 | 2 | — | — | 1 | — | 4 | — | 1 |
| 42 | 92 | 2 | — | 1 | — | — | 1 | — | 4 |
| 43 | 90 | 2 | — | — | — | 3 | — | 1 | 4 |
| 44 | 92 | — | 2 | 1 | — | — | 4 | — | 1 |
| 45 | 90 | — | — | — | 2 | 3 | 1 | — | 4 |

Table VIII lists the metallographic structure of each of ribbon-shaped alloy materials in the example Nos. 41 to 45 of the present invention. Furthermore, Table VIII lists the physical properties of each of the ribbon-shaped alloys $Al_a T_b X_c$ produced by subjecting the alloy materials to a thermal treatment at 400° C. for 1 hour and having a combined structure as described above.

TABLE VIII

| Example No. | Alloy material | | Alloy of $Al_aT_bX_c$ | |
|---|---|---|---|---|
| | Vf of MPT (%) | Vf of each P. (%) | Hardness (DPN) | Breaking strain |
| | | fcc | A.P. | | |
| 41 | 100 | 40 | 60 | 220 | 1.0 |
| 42 | 100 | 28 | 72 | 218 | 1.0 |
| 43 | 100 | 35 | 65 | 208 | 1.0 |
| 44 | 100 | 40 | 60 | 223 | 1.0 |
| 45 | 100 | 35 | 65 | 210 | 1.0 |

Vf = volume fraction
MPT = mixed phase structure in primary metallographic structure
each P. = each phase in mixed phase structure
A.P. = amorphous phase Table IX lists various compositions of ribbon-shaped allows of $Al_T_b X_c Z_d$ in example Nos. 46 to 55 of the present invention. In this case, Y is used as T, and Fe is used as X. Further, one element selected from a third group including Mn, Zr, Si, Ti, V, Cr, Nb, Mo and B is used as Z.

TABLE IX

| Example No. | Chemical constituent (atom %) | | | | | | | | | | |
|---|---|---|---|---|---|---|---|---|---|---|---|
| | Al | T | X | Z | | | | | | | |
| | | Y | Fe | Mn | Zr | Si | Ti | V | Cr | Nb | Mo | B |
| 46 | 92 | 3 | 4 | — | 1 | — | — | — | — | — | — | — |
| 47 | 92 | 3 | 4 | — | — | 1 | — | — | — | — | — | — |
| 48 | 92 | 3 | 4 | — | — | — | 1 | — | — | — | — | — |
| 49 | 92 | 3 | 4 | — | — | — | — | 1 | — | — | — | — |
| 50 | 92 | 3 | 4 | — | — | — | — | — | 1 | — | — | — |
| 51 | 92 | 3 | 4 | — | — | — | — | — | — | 1 | — | — |
| 52 | 92 | 3 | 4 | — | — | — | — | — | — | — | 1 | — |
| 53 | 92 | 3 | 4 | — | — | — | — | — | — | — | — | 1 |
| 54 | 92 | 3 | 4 | 2 | — | — | — | — | — | — | — | — |
| 55 | 92 | 3 | 4 | — | 2 | — | — | — | — | — | — | — |

Table X lists the metallographic structure of each of ribbon-shaped alloy materials in the example Nos. 46 to 55 of the present invention. Furthermore, Table X lists the physical properties of each of the ribbon-shaped alloys $Al_a T_b X_c Z_d$ produced by subjecting the alloy materials to a thermal treatment at 400° C. for 1 hour and having a combined structure as described above.

TABLE X

| Example No. | Alloy material | | Alloy of $Al_aT_bX_c$ | |
|---|---|---|---|---|
| | Vf of MPT (%) | Vf of each P. (%) | Hardness (DPN) | Breaking strain |
| | | fcc | A.P. | | |
| 46 | 100 | 55 | 45 | 245 | 1.0 |

TABLE X-continued

| Example No. | Alloy material | | Alloy of $Al_aT_bX_c$ | |
|---|---|---|---|---|
| | Vf of MPT (%) | Vf of each P. (%) | Hardness (DPN) | Breaking strain |
| | | fcc | A.P. | | |
| 47 | 100 | 50 | 50 | 240 | 1.0 |
| 48 | 100 | 55 | 45 | 242 | 1.0 |
| 49 | 100 | 55 | 45 | 251 | 1.0 |
| 50 | 100 | 60 | 40 | 247 | 1.0 |
| 51 | 100 | 50 | 50 | 229 | 1.0 |
| 52 | 100 | 55 | 45 | 233 | 1.0 |
| 53 | 100 | 55 | 45 | 240 | 1.0 |
| 54 | 95 | 75 | 25 | 270 | 0.15 |
| 55 | 95 | 70 | 30 | 261 | 0.18 |

Vf = volume fraction
MPT = mixed phase structure in primary metallographic structure
each P. = each phase in mixed phase structure
A.P. = amorphous phase Table XI lists various compositions of ribbon-shaped alloys of $Al_a T_b X_c Z_d$ in example Nos. 56 to 61 of the present invention. In this case, one element selected from a first group including Y and Mm (misch metal) is used as T, and Ni is used as X. Further, one element selected from a third group including Mn, Sr, Si, Ti, Cr and B is used as Z.

TABLE XI

| Example No. | Chemical constituent (atom %) | | | | | | | | | |
|---|---|---|---|---|---|---|---|---|---|---|
| | Al | T | | X | Z | | | | | |
| | | Y | Mm | Ni | Mn | Zr | Si | Ti | Cr | B |
| 56 | 92 | 3 | — | 4 | 1 | — | — | — | — | — |
| 57 | 92 | — | 3 | 4 | — | 1 | — | — | — | — |
| 58 | 91 | — | 3 | 4 | — | — | 2 | — | — | — |
| 59 | 92 | 3 | — | 4 | — | — | — | 1 | — | — |
| 60 | 92 | 3 | — | 4 | — | — | — | — | 1 | — |
| 61 | 92 | 3 | — | 4 | — | — | — | — | — | 1 |

Table XII lists the metallographic structure of each of ribbon-shaped alloy materials in the example Nos. 51 to 61 of the present invention. Furthermore, Table XII lists the properties of each of the ribbon-shaped alloys of $Al_a T_b X_c Z_d$ produced by subjecting the alloy materials to a thermal treatment at 400° C. for 1 hour and having a combined structure as described above.

TABLE XII

| Example No. | Alloy material | | Alloy of $Al_aT_bX_cZ_d$ | |
|---|---|---|---|---|
| | Vf of MPT (%) | Vf of each P. (%) | Hardness (DPN) | Breaking strain |
| | | fcc | A.P. | | |
| 56 | 100 | 35 | 65 | 233 | 1.0 |
| 57 | 100 | 35 | 65 | 233 | 1.0 |
| 58 | 95 | 40 | 60 | 249 | 1.0 |
| 59 | 100 | 35 | 65 | 239 | 1.0 |
| 60 | 100 | 45 | 55 | 238 | 1.0 |
| 61 | 100 | 40 | 60 | 240 | 1.0 |

Vf = volume fraction
MPT = mixed phase structure in primary metallographic structure
each P. = each phase in mixed phase structure
A.P. = amorphous phase Table XIII lists the compositions of ribbon-shaped alloys of $Al_a T_b X_c Z_d$ in example Nos. 62 to 63 of the present invention. In this case, one element selected from a first group including Y and Mm (misch metal) is used as T, and two elements Fe and Ni are used as X. Further, one element selected from a third group including Mn and Zr is used as Z.

TABLE XI

| Example No. | Chemical constituent (atom %) | | | | | | |
|---|---|---|---|---|---|---|---|
| | Al | T | | X | | Z | |
| | | Y | Mm | Fe | Ni | Mn | Zr |
| 62 | 92 | 3 | — | 3 | 1 | 1 | — |
| 63 | 92 | — | 3 | 3 | 1 | — | 1 |

Table XIV lists the metallographic structure of each of ribbon-shaped alloy materials in the example Nos. 62 and 63 of the present invention. Furthermore, Table XIV lists the properties of each of ribbon-shaped alloys of $Al_a T_b X_c Z_d$ produced by subjecting the alloy materials to a thermal treatment at 400° C. for hour and having a combined structure as described above.

TABLE XIV

| Example No. | Alloy material | | | Alloy of $Al_a T_b X_c Z_d$ | |
|---|---|---|---|---|---|
| | Vf of MPT (%) | Vf of each P. (%) | | Hardness (DPN) | Breaking strain |
| | | fcc | A.P. | | |
| 62 | 100 | 40 | 60 | 250 | 1.0 |
| 63 | 100 | 40 | 60 | 250 | 1.0 |

Vf = volume fraction
MPT = mixed phase structure in primary metallographic structure
each P. = each phase in mixed phase structure
A.P. = amorphous phase Table XV lists various compositions of ribbon-shaped allows of $Al_a T_b X_c Z_d$ in example Nos. 64 to 66 of the present invention. In this case, two elements Y and Mm (misch metal) are used as T, and two elements Fe and Ni are used as X. Further, one element selected from a third group including Mn, Zr and Si is used as Z.

TABLE XV

| Example No. | Chemical constituent (atom %) | | | | | | | |
|---|---|---|---|---|---|---|---|---|
| | Al | T | | X | | Z | | |
| | | Y | Mm | Fe | Ni | Mn | Zr | Si |
| 64 | 92 | 2 | 1 | 3 | 1 | 1 | — | — |
| 65 | 92 | 2 | 1 | 3 | 1 | — | 1 | — |
| 66 | 91 | 2 | 1 | 3 | 1 | — | — | 2 |

Table XVI lists the metallographic structure of each of ribbon-shaped alloy materials in the example Nos. 64 to 66 of the present invention. Furthermore, Table XVI lists the physical properties of each of ribbon-shaped alloys of $Al_a T_b X_c Z_d$ produced by subjecting the alloy materials to a thermal treatment at 400° C. for 1 hour and having a combined structure as described above.

TABLE XVI

| Example No. | Alloy material | | | Alloy of $Al_a T_b X_c Z_d$ | |
|---|---|---|---|---|---|
| | Vf of MPT (%) | Vf of each P. (%) | | Hardness (DPN) | Breaking strain |
| | | fcc | A.P. | | |
| 64 | 100 | 40 | 60 | 241 | 1.0 |
| 65 | 100 | 40 | 60 | 253 | 1.0 |
| 66 | 95 | 50 | 50 | 250 | 1.0 |

Vf = volume fraction
MPT = mixed phase structure in primary metallographic structure
each P. = each phase in mixed phase structure
A.P. = amorphous phase Table XVII lists various compositions of ribbon-shaped alloys of $Al_a T_b X_c Z_d$ in example Nos. 67 to 69 of the present invention. In this case, Y is used as T, and Fe is used as X. Further, two elements selected from a third group including Mn, Zr, Si and B are used as Z.

TABLE XVII

| Example No. | Chemical constituent (atom %) | | | | | | |
|---|---|---|---|---|---|---|---|
| | Al | T | X | Z | | | |
| | | Y | Fe | Mn | Zr | Si | B |
| 67 | 91 | 3 | 4 | 1 | 1 | — | 1 |
| 68 | 91 | 3 | 4 | 1 | — | 1 | — |
| 69 | 91 | 3 | 4 | 1 | — | — | 1 |

Table XVIII lists the metallographic structure of each of ribbon-shaped alloy materials in the example Nos. 67 to 69 of the present invention. Furthermore, Table XVIII lists the physical properties of each of ribbon-shaped alloys of $Al_a T_b X_c Z_d$ produced by subjecting the alloy materials to a thermal treatment at 400° C. for 1 hour and having a combined structure as described above.

TABLE XVIII

| Example No. | Alloy material | | | Alloy of $Al_a T_b X_c Z_d$ | |
|---|---|---|---|---|---|
| | Vf of MPT (%) | Vf of each P. (%) | | Hardness (DPN) | Breaking strain |
| | | fcc | A.P. | | |
| 67 | 95 | 55 | 45 | 269 | 0.16 |
| 68 | 95 | 55 | 45 | 261 | 0.18 |
| 69 | 95 | 55 | 45 | 270 | 0.16 |

Vf = volume fraction
MPT = mixed phase structure in primary metallographic structure
each P. = each phase in mixed phase structure
A.P. = amorphous phase An example of the fabrication of a structural member by use of an alloy material produced in the form of a powder will be described below.

In the course of the fabrication of this structural member, the allow material is subjected to a thermal treatment to provide an aluminum alloy according to the present invention.

(i) To form the structural member from a quaternary alloy of the type described above ($Al_{92}Y_3Fe_4Mn_1$), an Al—Y—Fe—Mn type base alloy was produced by a high frequency melting process and subjected to a gas atomizing process to provide a powdery alloy material having an average particle size of 12.6 μm.

The volume fraction Vf of a single-phase structure (fcc) in a primary metallographic structure of this powdery alloy material is of 100%.

(ii) The powdery alloy material was placed into a rubber mold and subjected to a cold isostatic pressing process (CIP process) under a condition of pressing force of 4 ton/cm² to form a short cylindrical green compact having a diameter of 58 mm, a length of 60 mm and a density of 85%. The green compact was placed into a can made of an aluminum alloy (A6061 material) and having an outside diameter of 78 mm, a length of 70 mm and thickness of 10 mm to form a billet.

(iii) The billet was placed into a heating furnace and heated at 350° C. under a reduced pressure of at most $10^{-3}$ Torr for 3 hours; thus, the green compact was subjected to a thermal treatment and a degassing treatment at the same time.

By this thermal treatment, the powdery alloy material constituting the green compact becomes a quaternary alloy having a secondary metallographic structure including a combined structure of the type described above.

(iv) Immediately after the above-described treatment, the billet was placed into a container of an extruder having a die diameter of 22 mm and subjected to a hot extrusion at an extrusion temperature of 400° C. to provide a bar-like structural member.

Figure 9:
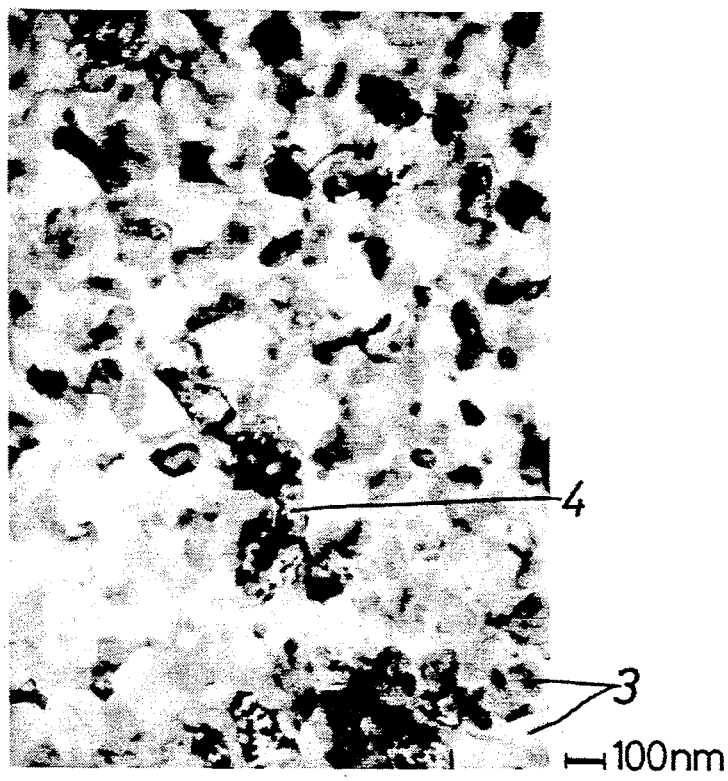
FIG. 9 is a photomicrograph showing the metallographic structure of a structural member.

FIG. 9 is a transmission type electron photomicrograph (50,000×magnification) showing the metallographic structure of the structural member. The combined structure thereof is comprised of crystal particles 3 constituting a matrix and an intermetallic compound 4 in correspondence to the quaternary alloy shown in FIG. 5.

As compared with the quaternary alloy, the metallographic structure of the structural member is somewhat coarse, but not only the particle size of the crystal particles 3 but also the particle size of the intermetallic compound 4 were controlled to approximately 400 nm or less. This means that a partial variation in structure and a coalescence of the structure are not produced in the quaternary alloy even by the aid of thermal exposure in a service environment, a hot plastic working and the like.

Figure 10:
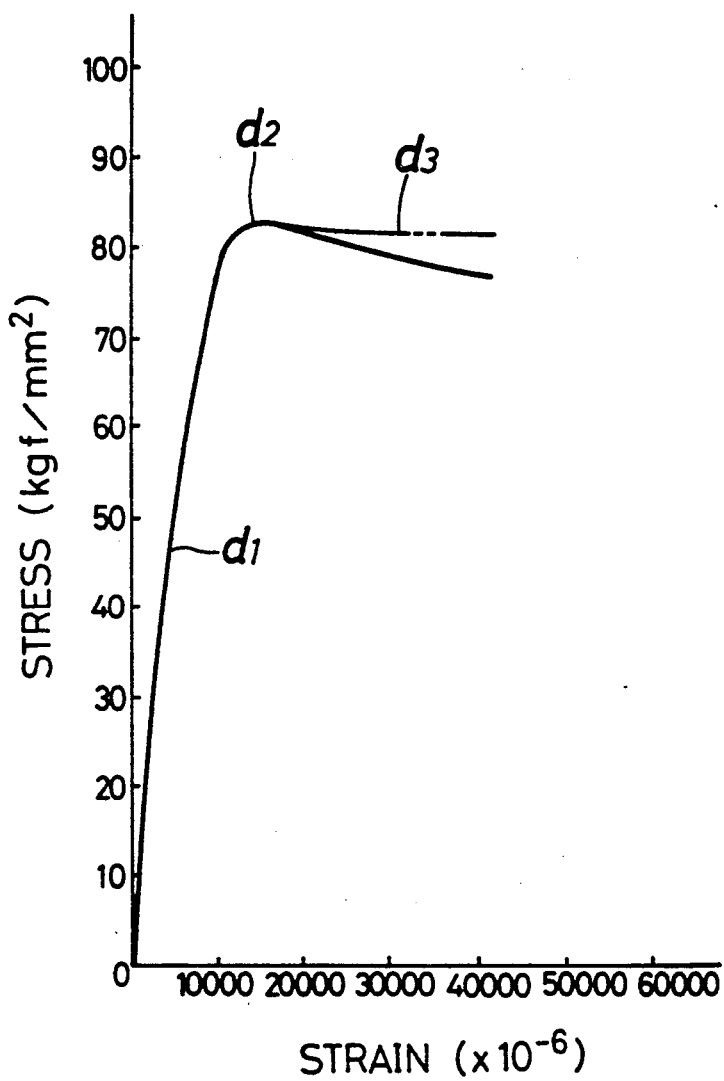
FIG. 10 is a graph illustrating a stress-strain curve.

A test piece was fabricated from the structural member, and using an Instron type tensile tester, a tensile test was carried out for the test piece to provide a stress-strain curve shown in FIG. 10. The structural member exhibited a tensile strength of 89.9 Kgf/mm$^2$, an elongation of 10%, and a draw of 37.3%.

The stress-strain curve indicates that the load, after the maximum load, is gradually reduced with a decrease in sectional area of the test piece due to a draw, and finally leads to a fracture. In this case, if the load at the fracture is divided by the sectional area at the fracture, the stress is substantially equal to that at the maximum load. It was ascertained thereby that the work-hardening of the test piece was very small. This is also substantiated from the fact that only a portion of the test piece is extremely constricted.

Figure 11:
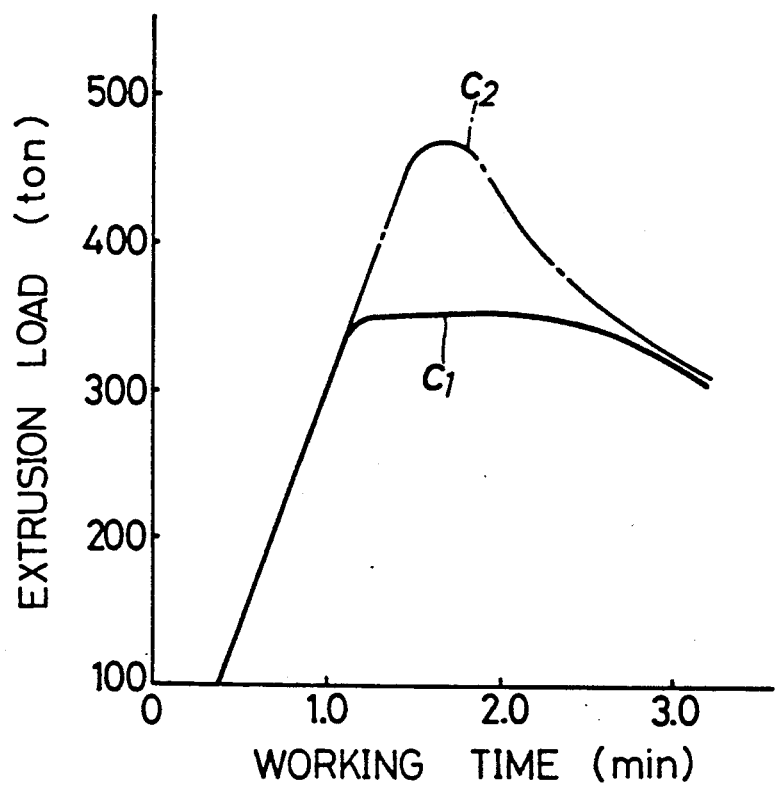
FIG. 11 is a graph illustrating the relationship between the working time and the extrusion load.

The nature that the work-hardening is very small in this manner is extremely significant to plastic working. For example, in a hot extrusion and with a quaternary alloy as shown by a line $c_1$ in FIG. 11, the load at the start of extrusion is as relatively low as about 350 ton, and after the extrusion, the load is little varied. With the prior art aluminum alloy, e.g., an Al- 8% Fe (by weight)-4% Ce (by weight) alloy (see Japanese Patent Application Laid-open No. 248860/85), however, after a peak load peculiar to a single action extrusion is obtained as indicated by a line $c_2$ in FIG. 11, the load gradually reduces as the length of the billet is shortened.

Table XIX shows a comparison of the tensile characteristic of a quaternary alloy with that of the prior art alloy.

TABLE XIX

|  | Tensile strength $\sigma_B$ (Kgf/mm$^2$) | | Yield strength $\sigma_{0.2}$ (Kgf/mm$^2$) | |
| --- | --- | --- | --- | --- |
|  | R.T. | 300° C. | R.T. | 300° |
| Quaternary alloy | 82.4 | 35.2 | 76.7 | 30.8 |
| Prior art alloy | 56.0 | 27.1 | 48.2 | 21.3 |

R.T. = room temperature

As apparent from Table XIX, the quaternary alloy has an excellent tensile characteristic, as compared with the prior art alloy.

This means that if a hot plastic working is carried out using an aluminum alloy produced according to the present invention, a structural member having a high strength can be obtained under a low load.

It is believed that a plastic deformation of the quaternary alloy as described above depends on the particle size of crystal particles in a combined structure, the state of the combined structure, and the hardness of the crystal particles.

If the stress-strain curve in FIG. 10 is corrected by the sectional area of the test piece, the stress, after passing the maximum load, is substantially constant with respect to an increase in strain, as shown by a dashed line in FIG. 10, and the work hardening is not observed. It is believed that an elastic deformation occurs in a region $d_1$ in FIG. 10, and a plastic deformation occurs in a region $d_2$ due to a slipping between crystal particles and a rolling thereof without change of the crystal particles, and such condition is continued to a region $d_3$.

Therefore, (i) if the particle size of crystal particles exceeds 400 nm, the interfacial energy between the crystal particles is reduced, resulting in a reduced strength of the resulting aluminum alloy. In addition, with a coalescence of the crystal particles, a dislocation passes into the crystal particles, resulting in a deformation form which can be explained by a usual dislocation theory. Thus, the strength, toughness and ductility are not reconciled.

(ii) If the combined structure is nonuniform, it is difficult to deform such a nonuniform portion under the same condition as does a uniform portion. As a result, the strength, toughness and ductility of the resulting aluminum alloy are reduced with an increase in nonuniform portion.

(iii) The crystal particles have a relative high hardness, but if the crystal particles are small, the interfacial energy is correspondingly increased and hence, even if the hardness of the crystal particles is high, the toughness and ductility are not reduced, and the strength is increased.

Such requirements for the metallographic structure can be easily satisfied according to the present invention by a method in which a secondary metallographic structure of the type described above is derived from a primary metallographic structure of the type described above.

Table XX lists the physical properties of each of various structural members produced by a similar method. In Table XX, the numerical value in the "example" column corresponds to the numerical value in the "example" column in Tables III and IX described above.

TABLE XX

| Example No. | Composition (atom %) | Ten. str. $\sigma$ (kgf/mm$^2$) | Elongation (%) | Draw (%) |
| --- | --- | --- | --- | --- |
| 18 | Al$_{92}$Y$_2$Ni$_6$ | 70.1 | 11.5 | 38.8 |
| 21 | Al$_{92}$Md$_3$Fe$_5$ | 74.0 | 10.1 | 40.0 |
| 22 | Al$_{90}$Ca$_5$Fe$_5$ | 63.2 | 12.7 | 46.3 |
| 46 | Al$_{92}$Y$_3$Fe$_4$Zr$_1$ | 86.4 | 10.2 | 38.0 |
| 53 | Al$_{92}$Y$_3$Fe$_4$B$_1$ | 89.2 | 9.7 | 39.9 |
| 54 | Al$_{91}$Y$_3$Fe$_4$Mn$_2$ | 100.1 | 6.5 | 28.2 |

What is claimed is:

1. A process for producing a high strength and high toughness aluminum alloy, comprising
a first step of preparing an alloy material which has a primary metallographic structure with a volume fraction Vf of a single-phase structure of at least 90%, said single-phase structure is comprised of crystal particles having a particle size of less than 30 nm and an fcc structure (face-centered cubic structure), said alloy material having a composition represented by the chemical formula:

$$Al_a T_b X_c$$

wherein T is at least one element selected from a first group consisting of Y, La, Ce, Mm (misch metal) and Ca; X is at least one element selected from a second group consisting of Fe, Co and Ni (but at least one element of Co and Ni, if only Y is selected from the first group); and each of a, b and c represents an atom %, with the proviso that $85 \leq a \leq 97$, $1 \leq b \leq 10$, and $2 \leq c \leq 15$, and a second step of subjecting said alloy material to a thermal treatment at a temperature in a range of ±100° C. of the temperature of destruction of said single-phase structure to destroy said single-phase structure, thereby providing a second metallographic structure having a combined structure in which an intermetallic compound is uniformly dispersed in a matrix, consisting essentially of crystal particles having a particle size of at most 400 nm.

2. A process for producing a high strength and high toughness aluminum alloy, comprising a first step of preparing an alloy material which has a primary metallographic structure with a volume fraction Vf of a mixed-phase structure of at least 90%, said mixed-phase structure being comprised of an amorphous phase and crystal particles having a particle size of less than 30 nm and an fcc structure with a volume fraction Vf of said amorphous phase in said mixed-phase structure being of at most 80%, and said aluminum alloy has a composition represented by the chemical formula:

$$Al_a T_b X_c$$

wherein T is at least one element selected from a first group consisting of Y, La, Ce, Mm (misch metal) and Ca; X is at least one element selected from a second group consisting of Fe, Co and Ni (but at least one element of Co and Ni, if only Y is selected from the first group); and each of a, b and c represents and atom %, with the proviso that $85 \leq a \leq 97$, $1 \leq b \leq 10$, and $2 \leq c \leq 15$, and a second step of subjecting said alloy material to a thermal treatment at a temperature in a range of ±100° C. of the temperature of destruction of said mixed-phase structure to destroy said mixed-phase structure, thereby providing a second metallographic structure having a combined structure in which an intermetallic compound is uniformly dispersed in a matrix consisting essentially of crystal particles having a particle size of at most 400 nm.

3. A process for producing a high strength and high toughness aluminum alloy, comprising a first step of preparing an alloy material which has a primary metallographic structure with a volume fraction of a single-phase structure of at least 90%, said single-phase structure is comprised of crystal particles having a particle size of less than 30 nm and an fcc structure, said alloy material having a composition represented by a chemical formula:

$$Al_a T_b X_c Z_d$$

wherein T is at least one element selected from a first group consisting of Y, La, Ce, Mm (misch metal) and Ca; X is at least one element selected from a second group consisting of Fe, Co and Ni; Z is at least one element selected from a third group consisting of Ti, V, Cr, Mn, Zr, Nb, Mo, Si and B; and each of a, b, c and d. represents an atom %, with the proviso that $85 \leq a \leq 97$, $1 \leq b \leq 10$, $2 \leq c \leq 15$, and $d \leq 3$, and a second step of subjecting said alloy material to a thermal treatment at a temperature in a range of ±100° C. of the temperature of destruction of said single-phase structure to destroy said single-phase structure, thereby providing a second metallographic structure having a combined structure in which an intermetallic compound is uniformly dispersed in a matrix consisting essentially of crystal particles having a particle size of at most 400 nm.

4. A process of producing a high strength and high toughness aluminum alloy, comprising a first step of preparing an alloy material which has a primary metallographic structure with a volume fraction Vf of a Mixed-phase structure of at least 90%, said mixed-phase structure is comprised of an amorphous phase and crystal particles having a particle size of less than 30 nm and an fcc structure with a volume fraction of said amorphous phase in said mixed-phase structure being of at most 80%, said alloy material having a composition represented by the chemical formula:

$$Al_a T_b X_c Z_d$$

wherein T is at least one element selected from a first group consisting of Y, La, Ce, Mm (misch metal) and Ca; X is at least one element selected from a second group consisting of Fe, Co and Ni; Z is at least one element selected from a third group, consisting of Ti, V, Cr, Mn, Zr, Nb, Mo, Si and B; and each of a, b, c, and d represents an atom %, with the proviso that $85 \leq a \leq 97$, $1 \leq b \leq$, 10, $2 \leq c \leq 15$, and $d \leq 3$, and a second step of subjecting said alloy material to a thermal treatment at a temperature in a range of ±100° C. of the temperature of destruction of said mixed-phase structure to destroy said mixed-phase structure, thereby providing a second metallographic structure having a combined structure in which an intermetallic compound is uniformly dispersed in a matrix consisting essentially of crystal particles having a particle size of at most 400 nm.

* * * * *